Figure 1:
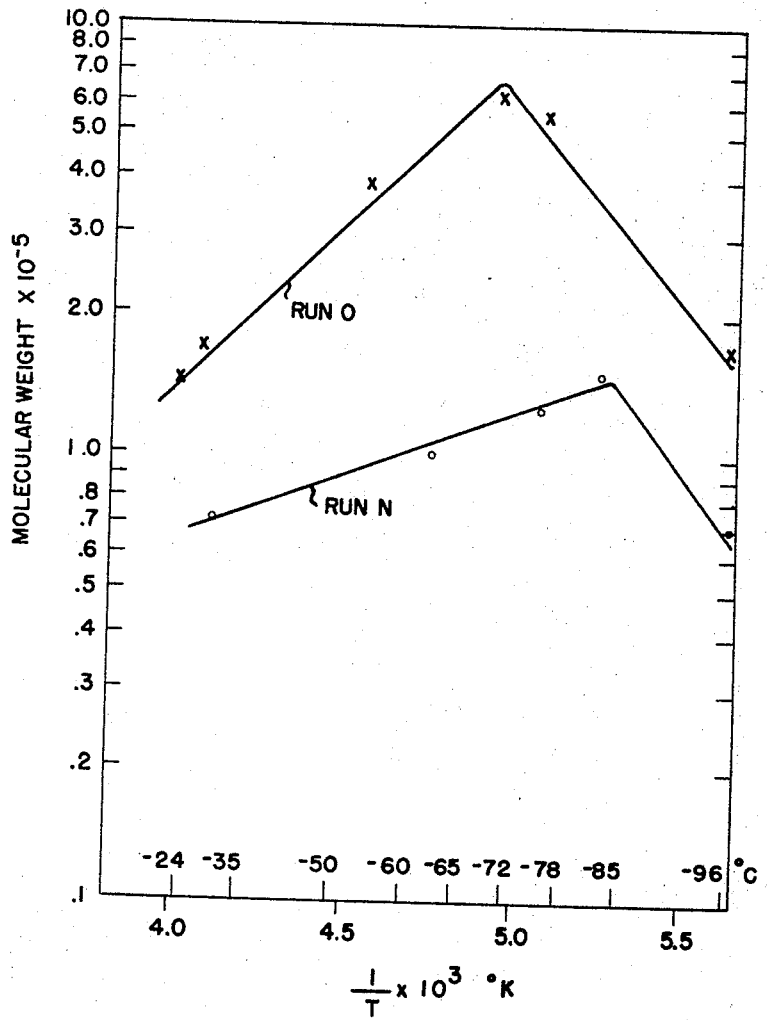

United States Patent Office 3,349,065
Patented Oct. 24, 1967

3,349,065
BUTYL RUBBER CATALYST SYSTEM UTILIZING AlR₂X WITH AN HX PROMOTER
Joseph P. Kennedy, Clark, N.J., assignor to Esso Research and Engineering Company, a corporation of Delaware
Filed May 1, 1964, Ser. No. 364,110
7 Claims. (Cl. 260—85.3)

The present invention relates to the use of an improved catalyst system for producing high molecular weight butyl type rubbers and to the high molecular weight butyl type rubbers prepared by using a novel catalyst system. In addition, the invention relates to the production of butyl rubber of high molecular weight by a new process which allows the use of higher temperatures than have heretofore been possible. More particularly, this invention concerns the carrying out of butyl rubber polymerizations in the presence of a catalyst system comprising a dialkyl aluminum monohalide, together with a small but critical amount of an anhydrous hydrogen halide as a promoter at a temperature of between about 0° C. and about −100° C.

Butyl type rubber produced by a Friedel-Crafts catalyst system has long been known in the art. See, for example, U.S. Patent No. 2,356,128 to Thomas et al. among others. The catalyst most frequently used for the production of butyl type rubber has been aluminum chloride dissolved in methyl or ethyl chloride solution. The use of an alkyl halide solution has been necessitated by the fact that aluminum chloride is virtually insoluble in hydrocarbons. Furthermore, aluminum chloride is but sparingly soluble in alkyl halide solutions. This low solubility has given rise to many difficulties in the control of the butyl rubber polymerization reaction.

One major difficulty concerns the preparation of the catalyst and the determination of the amount of catalyst to be used. The preparation of the catalyst solution is a separate and intricate operating step and is usually performed by passing a stream of methyl chloride through a bed of solid aluminum chloride at a certain temperature and rate. The length of the bed, the rate of passage, particle size, temperature, etc., determine the final strength of the catalyst solution. Catalyst concentration is determined by titration and the solution is then diluted to the desired concentration level. Titration, however, involves hydrolysis of aluminum chloride with water under standard conditions and back-titration of the evolved hydrochloric acid with standard sodium hydroxide solution. The chemistry of this procedure is ill defined and it does not give fundamentally meaningful results. The definition of catalyst "quality" remains an unsolved problem. This situation could be fundamentally improved if the catalyst solution were prepared in one step by diluting a well-defined liquid catalyst with a predetermined amount of solvent.

A further problem concerns the rate of catalyst introduction. The proper functioning of the reactor depends a great deal upon the ability of operating personnel to adjust the catalyst addition rate at start up and after polymerization has begun. With aluminum chloride as the catalyst, it has not as yet been possible to calculate with any accuracy the proper catalyst introduction rate.

The use of a soluble catalyst system would alleviate many of these operating difficulties and provide other benefits such as a more uniform product, a smaller amount of catalyst residue in the product, and the ease of handling a liquid catalyst. Coassigned U.S. patent application, S.N. 266,267, filed Mar. 20, 1963, describes a liquid catalyst system for the production of butyl rubber. The catalyst system described therein comprises an alkyl aluminum halide with a ratio of alkyl groups to halogen atoms corresponding approximately to the formula $AlRX_2$, where R is an alkyl group and X represents a halogen atom. It was pointed out in that application that where the ratio of alkyl groups to halogen atoms is reversed, i.e. the formula is $AlR_2X$, no polymerization will occur.

It has previously been proposed to use organoaluminum compounds with an excess of hydrogen halide in order to produce an aluminum halide catalyst in situ. See for example, U.S. Patent 2,388,428. It has also been proposed to use less than an excess of hydrogen halide, such as ¼ to ½ mole of hydrogen halide per mole of organoaluminum compound, to produce low molecular weight oily polymers. See, coassigned French Patent 1,235,835. However, it has not up to this time been possible to produce solid elastomeric polymers of isoolefins by means of an organoaluminum-hydrogen halide catalyst system.

It has now been discovered that high molecular weight butyl type rubbers may be produced through the use of a dialkyl aluminum monohalide catalyst system, provided a small but critical amount of an anhydrous hydrogen halide is purposefully introduced or is present as a promoter. One of the chief advantages of the dialkyl aluminum monohalide-promoter system for the production of butyl rubber resides in its great flexibility. The catalyst has a general formula $AlR_2X$, where R is a $C_1$ to $C_{12}$ aliphatic hydrocarbon radical, and X may be either fluorine, chlorine or bromine. The promoter is a hydrogen halide, such as those given in the examples, i.e., HCl, HBr and HF. The polymerization reaction can be run at temperatures from about 0° C. to about −100° C., preferably from about −20° C. to about −90° C. Reaction time may be anywhere from about one second to about three hours, preferably from about ten minutes to about two hours. Pressure may be atmospheric pressure or slightly above atmospheric pressure.

In addition to flexibility with respect to catalyst and promoter, the use of the catalyst system of the present novel process allows a greater degree of reactor control. In the present commercial method of preparing butyl rubber, reactor control is extremely difficult due to the low solubility of aluminum chloride in the alkyl halide solvent. The concentration of the catalyst solution can be altered within only a very narrow range and, within this range, polymerization is extremely rapid and highly exothermic. These rapid exothermic reactions require a disposal of large amounts of heat. Furthermore, because high conversions are obtained only when the catalyst is introduced continuously, continuous catalyst introduction increases the unit cost and catalyst efficiently becomes a rather important cost factor. The flexibility of the dialkyl aluminum chloride-promoter system allows much greater reactor control than has heretofore been possible. Here, the rate of polymerization can be conveniently controlled by the amount of promoter introduced. Catalyst efficiencies obtained with a dialkyl aluminum halide, e.g., diethyl aluminum chloride, are comparable to or higher than those obtained with aluminum chloride. Catalyst efficiencies with the present process are usually about 100 grams of product per gram of catalyst, but in some instances much higher values, e.g., 900 grams of product per gram of catalyst are obtained. Furthermore, since in high concentrations the hydrogen halide promoter, e.g., HCl, is a molecular weight poison, by controlling the amount of promoter introduced, the product molecular weight can also be controlled.

One advantage arising from the solubility of this novel catalyst system resides in the fact that polymerization may take place with little or no alkyl halide solvent present, e.g., less than 10 weight percent. In this case, the unreacted monomer mixture functions as the diluent. Such a bulk polymerization results in considerable savings in cost as the result of the elimination of the solvent recovery system and elimination of the need to replace the highly volatile methyl chloride diluent.

Figure 2:
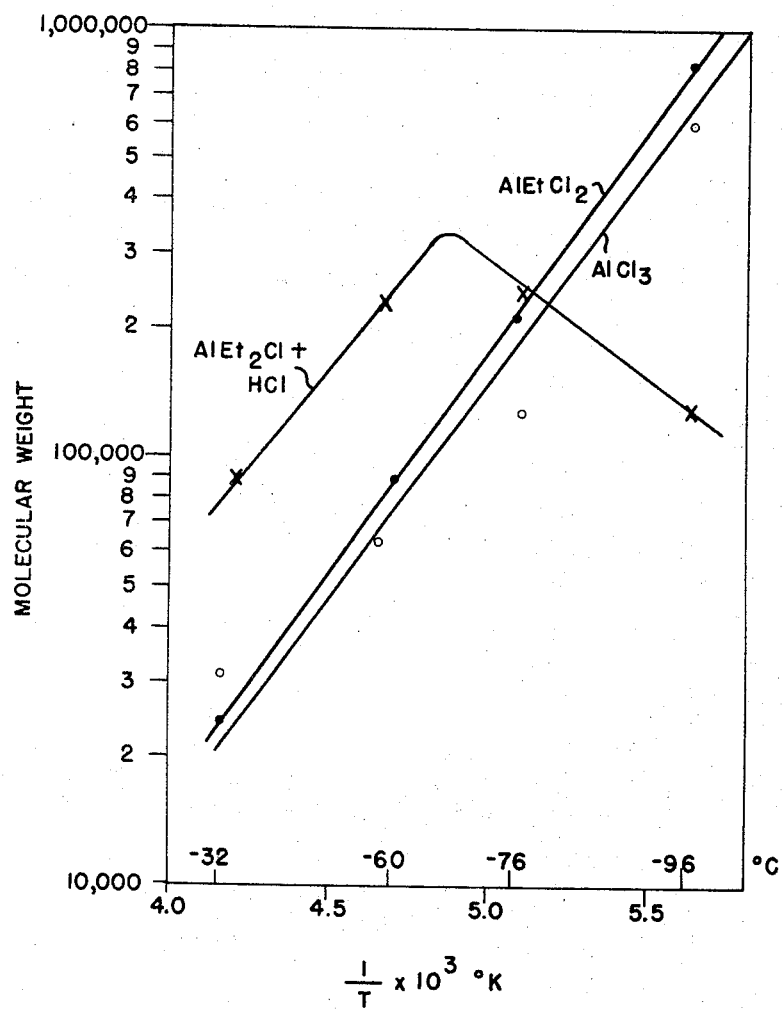

The exact nature and objects of this invention will be more clearly perceived and more fully understood by referring to the following description and claims taken in connection with the accompanying drawings in which:

FIGURE 1 is a plot of the logarithm of the molecular weight of an isobutene-isoprene copolymer product versus the reciprocal of the polymerization temperature in degrees Kelvin for an AlEt$_2$Cl-HCl catalyst system. (Corresponding centigrade temperatures are set forth above the horizontal scale.) The two curves depicted in FIGURE 1 represent polymerizations run at two different monomer concentration levels. The isobutene-isoprene concentration in Run N is 2.89 moles per liter of methyl chloride and the concentration in Run O is 9.69 moles per liter of methyl chloride; and FIGURE 2 is a plot of the logarithm of the molecular weight of an isobutene-isoprene copolymer product versus the reciprocal of the polymerization temperature in degrees Kelvin when employing AlCl$_3$, AlEtCl$_2$ or AlEt$_2$Cl-HCl catalyst systems. Corresponding centigrade temperatures are set forth above the horizontal scale. The three curves depicted in FIGURE 2 illustrate the relationship of the molecular weight of an isobutene-isoprene polymerization product to the polymerization temperature for the aforementioned three catalyst systems.

The olefin polymerization feeds used in connection with the present catalyst system are those compounds normally used in the preparation of butyl type rubber polymers. These polymers are prepared by reacting a major amount, e.g., about 70 to 99.5 parts by weight, preferably 85–99.5 parts by weight, of an isoolefin with a minor amount, e.g., about 30 to 0.5 parts by weight, preferably 15 to 0.5 parts by weight of a multiolefin. The isoolefin, in general, is a C$_4$ to C$_7$ compound, e.g., isobutene or 2-methyl-1-butene, 3-methyl-1-butene, 2-methyl-2-butene and 4-methyl-1-pentene. The multiolefin, in general, is a C$_4$ to C$_{14}$ conjugated diolefin, e.g., isoprene, butadiene, 2,3-dimethyl-1,3-butadiene, 2-methyl-1,5-hexadiene myrcene, 6,6-dimethylfulvene and piperylene. The preferred polymer is obtained by reacting about 95 to 99.5% by weight of isobutene with about 0.5 to 5% by weight of isoprene. Cyclodiolefinic compounds such as cyclopentadiene and methylcyclopentadiene as well as compounds such as β-pinene and divinylbenzene may be incorporated with the isoolefin either in addition to the diolefin or in place of the diolefin. These additional olefinic compounds may be incorporated in amounts up to about 6 weight percent based on isoolefin, preferably in amounts from 0.3 to about 2.0 weight percent. Copolymers and terpolymers formed with the cyclodiolefins have improved ozone resistance and compare favorably in molecular weight with conventional butyl rubber copolymers.

The solvents used with the present novel catalyst system may be any of the solvents normally used for the preparation of butyl rubber. Specific examples of suitable solvents are methyl chloride, methylene chloride, ethyl chloride, methyl bromide, carbon disulfide, vinyl chloride and chlorobenzene. The preferred solvent is methyl chloride. Hydrocarbon solvents that are liquid at the polymerization temperature may also be used. These include C$_2$ through C$_{16}$ saturated aliphatic and alicyclic hydrocarbons, such as pentane, isopentane, isooctane, methyl cyclohexane, cyclohexane, etc.

The catalyst system which is an essential feature of the present novel process comprises a dialkyl aluminum monohalide and a small but critical amount of anhydrous hydrogen halide promoter. For purposes of brevity, the dialkyl aluminum monohalide will be referred to as the "catalyst," though it should be realized that these substances by themselves will not act as catalysts in butyl rubber polymerizations. The dialkyl aluminum monohalide catalysts contemplated for use in the present process are those substances represented by the formula AlR$_2$X, where R is a branched or straight chain alkyl having from 1 to 12 carbon atoms, and X represents a halogen atom selected from the group consisting of fluorine, chlorine and bromine. Specific examples of suitable R groups include: methyl, ethyl, isopropyl, isobutyl, n-pentyl, hexyl, octyl, n-decyl, etc. The preferred compound is diethyl aluminum chloride, which will be used here for illustrative purposes.

Diethyl aluminum chloride, which is commercially available, is a clear colorless liquid with a melting point of −74° C., and a boiling point of 208° C. The substance is highly reactive with oxygen and will burst into flames in air and react violently with water. It is miscible with saturated aliphatic and alicyclic hydrocarbons, chlorinated hydrocarbons, carbon disulfide, etc. Diethyl aluminum chloride can be prepared separately or in situ from aluminum triethyl and aluminum chloride according to the following formula:

$$2Al(C_2H_5)_3 + AlCl_3 \rightarrow 3Al(C_2H_5)_2Cl$$

The promoter utilized in the present catalyst system is an hydrous hydrogen halide, i.e., hydrogen chloride, hydrogen bromide, hydrogen fluoride, etc. The amount of promoter used must be carefully regulated so as not to exceed a mole ratio of about 0.05 mole of promoter per mole of catalyst. The preferable range is from about 0.001 mole to about 0.05 mole of promoter per mole of catalyst. The presence of an excess amount of promoter in the reaction mixture will cause uncontrolled polymerization which results in a sharp depression of product molecular weight due to the sudden rise in polymerization temperature and also leads to a complete inactivation of the catalyst system.

Since the presence of hydrogen chloride, hereafter designated HCl in the butyl polymerization reaction is a well known molecular weight depressant, it is quite surprising to find that this same substance will impart catalytic activity to diethyl aluminum chloride, a compound which does not normally function as a butyl rubber polymerization catalyst. The effect of the addition of an anhydrous hydrogen halide promoter can best be understood from the following examples.

Molecular weights of the polymers prepared in the subsequent examples were obtained from viscosity measurements of 0.1% polymer solutions in diisobutylene at 20° C. The intrinsic viscosities were obtained from single measurements using the slope of the curve, ln $\eta_{INH}$/C. (inherent viscosity/concentration). The viscosity average molecular weights were calculated from the equation:

$$\ln M_v = 12.48 + 1.565 \ln [\eta]$$

Physical properties of vulcanizates were determined according to the methods described in ASTM D412–51T.

*Example 1*

In Run A, 0.01 mole of liquid diethyl aluminum chloride catalyst was dissolved in 100 ml. of methyl chloride. The temperature was adjusted and maintained at −50° C. To this solution was added dropwise 100 ml. of a monomer mixture containing 7 volume percent of isobutene and 3 volume percent of isoprene. Even with vigorous agitation over a period of 90 minutes, no polymerization occurred.

In Run B, 0.01 mole of diethyl aluminum chloride was dissolved in 75 ml. of methyl chloride, and the temperature adjusted to −75° C. 100 ml. of the monomer mixture used in Run A was added and the resulting mixture was stirred for ten minutes. No polymerization occurred.

A promoter solution was prepared by dissolving about 10 millimoles (0.67 ml.) of liquid HCl in 7.5 ml. of methyl chloride at −90° C. One ml. of this solution, representing approximately 4×10$^{-3}$ mole HCl was added to the quiescent mixture of the above-stated monomers, solvent, and catalyst. An instantaneous explosive polymerization reaction occurred which caused the polymer product to be thrown out of the reactor.

Run C was a control run containing no catalyst and designed to shown that the promoter alone would not cause polymerization. The monomer mixture of Run A was dissolved in 100 ml. of methyl chloride and 1 ml. of the HCl promoter solution of Run B was added. No polymerization occurred.

The results are summarized in Table I.

TABLE I

| Run | Solvent | Initial Temp. | Catalyst | Promoter | Product Yield |
|---|---|---|---|---|---|
| A | 100 ml. CH$_3$Cl | −50° C. | 0.01 mole Al(C$_2$H$_5$)$_2$Cl. | None | None. |
| B | 75 ml. CH$_3$Cl | −75° C.↑ | ___do___ | HCl, ~4×10$^{-3}$ mole. | ~100%.[1] |
| C | 100 ml. CH$_3$Cl | −50° C. | None | ___do___ | None. |

[1] Runaway reaction, low molecular weight product.

The data in Table I show that as little as 0.4 mole of hydrogen chloride per mole of catalyst results in an explosive polymerization which gives an increase in temperature and a product of low molecular weight.

Example 2

In Runs D and E, solvents other than alkyl halides, the conventional solvents for butyl rubber polymerizations, were used. Run D utilized n-pentane and Run E used carbon disulfide.

In Run D, 0.01 mole of liquid diethyl aluminum chloride catalyst was dissolved in 100 ml. of n-pentane. The temperature was adjusted and maintained at −50° C. To this solution was added 100 ml. of the monomer mixture described in Example 1. The mixture was stirred for 73 minutes, but no polymerization occurred in this monomer-catalyst solvent system. A promoter solution was prepared by dissolving approximately 0.06 mole of liquid HCl in 30 ml. of n-pentane. One ml. of this solution, representing approximately 1.5×10$^{-4}$ mole of HCl was added to the quiescent mixture in the reactor. An immediate explosive polymerization reaction occurred.

Run E was performed under similar conditions, except that in place of the n-pentane solvent of Run D, 100 ml. of carbon disulfide was used. The promoter of this run was the promoter solution used in Example 1. Again, no reaction occurred until the HCl promoter was added, whereupon an immediate explosive reaction took place. The results are summarized in Table II.

of 100 ml. of 97 volume percent isobutene and 3 volume percent isoprene, the same mixture used in Examples 1 and 2. The solvent in each of these runs was 100 ml. of methyl chloride. In Run F, 0.01 mole of diethyl aluminum chloride catalyst was dissolved in the solvent, and the monomer mixture added to this solution. No polymerization occurred after 30 minutes in this monomer-catalyst solvent system. A promoter solution of hyrogen bromide dissolved in methyl chloride was prepared, and approximately 1.3×10$^{-4}$ moles of hydrogen bromide was added to the system. Polymerization started immediately upon promoter introduction and the temperature of the system, which had been maintained at −50° C., rose slowly until it reached −45° C. The polymerization was rapid, and was terminated 2 minutes after promoter introduction. The polymer yield was 7.0 grams, or approximately 9.9%. Run G was a duplicate of Run F with the exception that no diethyl aluminum chloride catalyst was present in the system. No polymerization occurred.

In Run H, a mixture containing 100 ml. of the above described monomers, 75 ml. of methyl chloride and 0.01 mole of diethyl aluminum chloride was stirred at −75° C. for 60 minutes. No polymerization took place during this time. A promoter solution of 0.025 mole of hydrogen fluoride in 20 ml. of methyl chloride was prepared. Approximately 2.5×10$^{-2}$ mole of hydrogen fluoride was then added to the reaction system. Vigorous polymerization started immediately upon introduction of the promoter and the temperature rose rapidly to −60° C. Within 60 minutes, stirring became impossible because of the large amounts of polymer formed and the reaction had to be terminated. Polymer product yield was 56 grams, or 80% conversion.

In Run I, 0.01 mole of diethyl aluminum chloride and 0.025 mole of hydrogen fluoride were dissolved in 100 ml. of methyl chloride, at a temperature of −50° C. The monomer feed, also at a temperature of −50° C., was added dropwise into this solution. Polymerization

TABLE II

| Run | Solvent | Temp. | Catalyst | Promoter | Prod. Yield |
|---|---|---|---|---|---|
| D | 100 ml. n-C$_5$H$_{12}$ | −50° C.↑ | 0.01 mole Al(C$_2$H$_5$)$_2$Cl. | ~1.5×10$^{-4}$ mole HCl in n-C$_5$H$_{12}$ | ~100%.[1] |
| E | 100 ml. CS$_2$ | −50° C.↑ | ___do___ | ~4×10$^{-3}$ mole HCl in CH$_3$Cl. | ([1]). |

[1] Runaway reaction.

The results in Table II indicate that the range of solvents usable in connection with the practice of this invention is not limited to alkyl halides, the most commonly used class of butyl rubber polymerization solvents. Indeed, polymerization occurs in n-pentane, a solvent not employable in conventional AlCl$_3$-catalyzed butyl rubber production.

Example 3

In Runs F, G, H, and I, the monomer mixture consisted began immediately and the temperature rose to −40° C. The rate of reaction was controlled by the slow rate of monomer introduction. Polymerization yielded 62 grams of polymer, or 87.5% conversion, however the molecular weight of the polymer was low due to the rapidity of the polymerization reaction.

These data, together with the properties of the polymer products, are set forth in Table III.

TABLE III

| Run | Solvent | Initial Temp. | Catalyst | Promoter | Product Yield | | Mol. Wt. ×10⁻³ | Mole percent Unsaturation |
|---|---|---|---|---|---|---|---|---|
| | | | | | Grams | Percent Conv. | | |
| F | 100 ml. CH₃Cl | −50° C. ↑ | 0.01 mole Al(C₂H₅)₂Cl | HBr, 1.3×10⁻⁴ mole | 7.0 | 9.9 | 265 [1] | 1.65 |
| G | 100 ml. CH₃Cl | −50° C. | None | do | None | | | 3.45 |
| H | 75 ml. CH₃Cl | −75° C. ↑ | 0.01 mole Al(C₂H₅)₂Cl | HF, 2.5×10⁻² mole | 56 | 80 | Low [2] | |
| I | 100 ml. CH₃Cl | −50° C. ↑ | do | do | 62 | 87.5 | do | 1.81 |

[1] Very rapid reaction. [2] Runaway reaction.

The data in Table III indicate that hydrogen bromide and hydrogen fluoride are effective promoters for use with dialkyl aluminum monohalide catalysts. Furthermore, Runs H and I indicate that this soluble process provides considerable flexibility in the method of polymerization.

The data in Examples 1 through 3 indicate that the products obtained are of low molecular weight. The low molecular weight of the products can be attributed to the heat rise and extreme rapidity of the reactions. However, these reactions, can be controlled by regulating the concentration and rate of introduction of the promoter into the reaction system. In the following example, the effect of the solvent dipole moment on the instantly disclosed polymerization reaction was studied.

Example 4

In Runs J and K, the reactions were run under precisely the same conditions as in Run A of Example 1, with the exception that the solvent employed was ethyl chloride rather than methyl chloride. No promoter was added in either run.

In Run J, a slow steady polymerization occurred, which was terminated after sixty minutes. The fact that polymerization took place in ethyl chloride, while, under identical conditions (Run A) it did not take place in methyl chloride is probably due to the fact that in the commercial manufacturing process, ethyl chloride always contains some HCl as an impurity because it is made from ethylene and HCl. In Run K, the ethyl chloride solvent was refluxed over solid potassium hydroxide pellets prior to use in an attempt to remove the HCl contaminant. It is apparent from the data obtained that considerable HCl was removed by this process. In Run K, polymerization was extremely slow and the yield, after 100 minutes, was much lower than the polymer yield in Run J after only sixty minutes of polymerization.

These data are summarized in Table IV, along with a repetition for comparison purposes, of the data from Run A.

as a catalyst in the production of butyl rubber. Furthermore, reference to Runs D and E of Example 2 show that polymerization can readily occur in pentane and carbon disulphide when a hydrogen halide promoter is used. It is of significance that neither of the latter two liquids has a dipole moment greater than 1.

A most significant advantage of the present catalyst system resides in its ability to produce butyl rubber at temperatures considerably higher than have heretofore been used, while still obtaining a product which compares favorably in molecular weight with the butyl rubber now commercially available.

In Example 5, comparisons are made among presently available commercial grades of butyl rubber, butyl rubber produced by the same method as commercial grade butyl rubber but at a higher temperature, and butyl rubber produced according to the instant novel process.

Example 5

In Run J of Example 4 and Run L, butyl rubber was produced using a diethyl aluminum chloride catalyst in a solvent which consisted of ethyl chloride contaminated with traces of HCl. The method of polymerization in Run J is described in Example 4 above. Run L follows the general method of polymerization used in Run J except that a total of 0.02 mole of diethyl aluminum chloride was added to 200 ml. of ethyl chloride solvent contaminated with traces of HCl, and the amount of monomer mixture used was 200 ml. In Run L, slow polymerization began immediately and was allowed to continue for ninety minutes. The yield of polymer was 90 grams, or approximately 63.5% conversion.

In Run M, butyl rubber was prepared according to the usual method of butyl rubber preparation, i.e., employing an aluminum chloride catalyst in methyl chloride solution. In Run M, however, instead of being run at the conventional temperature of −98° C., the reaction was run at −50° C. The data for Runs J, L and M, as well

TABLE IV

| Run | Solvent | Temperature | Catalyst | Promoter | Produce Yield | | Mol. Wt. ×10⁻³ |
|---|---|---|---|---|---|---|---|
| | | | | | Grams | Percent Conv. | |
| A | CH₃Cl | −50° C. | 0.01 mole Al(C₂H₅)₂Cl | None | 54.5 | 72.0 | 465 |
| J | "raw" C₂H₅Cl | −50° C. | 0.01 mole Al(C₂H₅)₂Cl | None | None | | |
| K | Partially purified C₂H₅Cl | −50° C. | 0.01 mole Al(C₂H₅)₂Cl | None | 11.0 | 16.0 | 447 |

The above data show that it is the presence of a promoter activator, not the dipole moment of the solvent, which determines whether diethyl aluminum chloride will act as the properties of the resulting vulcanizates, are shown in Table V together with a comparison of commercially available Butyl 218. Polymerization products were cured for 30 minutes at a temperature of 153° C., according to the following cure recipe:

|  | Parts per hundred parts of rubber |
|---|---|
| Butyl rubber | 100 |
| HAF black | 50 |
| ZnO | 5 |
| Stearic acid | 2 |
| Sulphur | 1.25 |
| Tetramethylthiuram disulphide | 2 |

TABLE V

| Run | Solvent | Catalyst | Temp., °C. | Yield percent | Mol. Wt. ×10⁻³ | Mol. percent Unsaturation | 300% Modulus | Tensile, p.s.i. | Elong. Percent |
|---|---|---|---|---|---|---|---|---|---|
| Butyl 218 [1] | CH₃Cl | AlCl₃ | −98 | (²) | 465 | 1.83 | 805 | 2,500 | 600 |
| J | C₂H₅Cl trace HCl | Al(C₂H₅)₂Cl | | 72.0 | 465 | | 1,200 | 2,550 | 700 |
| L | | | −50 | 63.5 | 460 | 2.09 | 1,200 | 3,057 | 600 |
| M | CH₃Cl | AlCl₃ | | 77.5 | 60 | | | | |

[1] Enjay Butyl 218 is a commercial grade of butyl rubber prepared by polymerizing isobutene with isoprene. It has a mole percent unsaturation of about 1.5–2.0%, and a Mooney viscosity (ML 3 min. at 260° F.) of about 50–60. For further information see Enjay Butyl Bulletin 041 (March 1960) published by the Enjay Chemical Company.
[2] Continuous.

The data in Table V show, that butyl rubber can be produced at a temperature of −50° C. when a catalyst system comprising diethyl aluminum chloride and a suitable promoter is used. This product compares favorably with the commercial grade butyl rubber 218 which requires a process reaction temperature of about −98° C. Run M shows that when butyl rubber is produced according to the conventional commercial method at a temperature of −50° C., the product is too low in molecular weight to be satisfactory. Thus, the present method enables butyl rubber to be produced at considerable savings because higher temperatures may be used.

More detailed studies were made on butyl rubber produced by the instantly described method in methyl chloride diluent using diethyl aluminum chloride as catalyst and HCl as a promoter.

*Example 6*

In these runs, 130 ml. of the monomer mixture described in Example 1 and 0.005 mole of diethyl aluminum chloride were mixed and stirred at selected temperature levels in methyl chloride. In Run N, monomer concentration was 2.89 moles per liter of methyl chloride and in Run O, monomer concentration was 9.69 moles per liter of methyl chloride. After thermal equilibrium was achieved, a dilute promoter solution was added dropwise to the reaction vessel. The promoter solution was prepared by absorbing gaseous HCl in 25 ml. of methyl chloride at a temperature of −78° C. until a volume increase of one milliliter was attained. Two ml. of this solution was then diluted with 25 ml. of fresh methyl chloride. The HCl promoter concentration was approximately 0.24 mole per liter. Polymerization began immediately upon promoter introduction. The results of these polymerizations are set forth in Table VI. In runs in which the temperature rose during polymerization, the results are recorded in the table at the highest temperature level reached.

The data in Table VI show that butyl rubber of satisfactory molecular weight can be made at considerably higher temperatures than have heretofore been possible in the commercial process.

FIGURE 1 is a plot of the logarithm of the molecular weight times $10^{-5}$ of the butyl rubber product obtained in Runs N and O versus the reciprocal of the polymerization temperature employed in degrees Kelvin times $10^3$. This plot illustrates graphically a surprising feature which appears in connection with the use of the instant novel catalyst system. When aluminum chloride is used as the catalyst for the polymerization of butyl rubber, there is a continuous straight line relationship between the reciprocal of the polymerization temperature in degrees Kelvin and the logarithm of the molecular weight of the resulting copolymers in the temperature range between −30° C. and −100° C. This relationship can be graphed as a straight line of positive slope indicating increasing molecular weight obtained upon employing decreasing temperatures and is depicted in FIGURE 2 by the straight line marked AlCl₃. However, when the novel diethyl aluminum chloride-promoter system of the present method is used, the positive slope of this straight line function appears to reach a maximum in the range of between about −70° C. and about −85° C. and then rapidly turns negative. Further discussion of this phenomenon appears hereafter.

During Runs N and O, samples of polymer were withdrawn for molecular weight determination during the initial "milky" period of the reaction. This milky period is a characteristic of butyl rubber polymerization and precedes the "slurry" of the reaction period. It was of interest to determine whether the molecular weight of the product formed during the milky period differed from that formed during the slurry stage. The results indicated that molecular weight is independent of the physical appearance of the reaction, i.e., milky or slurry, and, within experimental error, the products' molecular weights were identical.

Three polymer samples from Run O were cured according to the recipe given in Example 5. The physical properties of the vulcanizates are given in Table VII.

TABLE VI

| Run | Promoter | Monomer Conc., Mole/Liter | Temp., °C. | Promoter Added Moles ×10³ | Yield Grams | Yield Percent | M. Wt. ×10⁻³ | Unsat. Mole, Percent |
|---|---|---|---|---|---|---|---|---|
| N-1 | HCl | 2.89 | −30 | 0.25 | 7 | 33.3 | 73 | 1.50 |
| N-2 | HCl | 2.89 | −48 | 0.51 | 16 | 75 |  | 1.68 |
| N-3 | HCl | 2.89 | −63 | 0.31 | 11 | 51.5 | 101 | 1.69 |
| N-4 | HCl | 2.89 | −76 | 0.48 | 13.5 | 63.5 | 127 | 1.60 |
| N-5 | HCl | 2.89 | −83 | 0.52 | 8.5 | 39.9 | 149 | 1.6 |
| N-6 | HCl | 2.89 | −96 | 0.96 | 3.5 | 16.4 | 69 | 1.49 |
| O-1 | HCl | 9.69 | −24 | 0.052 | 14.5 | 20.5 | 143 | 1.41 |
| O-2 | HCl | 9.69 | −28 | 0.067 | 20.0 | 28.1 | 168 | 1.33 |
| O-3 | HCl | 9.69 | −55 | 0.045 | 21.0 | 30 | 397 | 1.49 |
| O-4 | HCl | 9.69 | −72 | 0.031 | 9.5 | 13.5 | 626 | 1.44 |
| O-5 | HCl | 9.69 | −77 | 0.052 | 20.0 | 28.1 | 561 | 1.43 |
| O-6 | HCl | 9.69 | −96 | 0.66 | 19.5 | 27.9 | 167 | 1.51 |

TABLE VII

| Run | Polymerization Temp., °C. | Cured 30' at 153° C. | | | Cured 60' at 153° C. | | |
|---|---|---|---|---|---|---|---|
| | | 300% Mod. | Tensile | Percent Elong. | 300% Mod. | Tensile | Percent Elong. |
| O-3 | −65 | 981 | 2,898 | 633 | 1,385 | 2,969 | 553 |
| O-4 | −72 | 517 | 2,677 | 740 | 776 | 2,690 | 680 |
| O-5 | −85 | 1,083 | 2,970 | 623 | 1,557 | 3,067 | 550 |
| Butyl 218 | −98 | 805 | 2,905 | 632 | 1,257 | 2,824 | 553 |

These data, which are compared with similar data for commercially available Butyl 218, show that vulcanizates produced from butyl rubbers manufactured according to the present novel process, compare favorably in physical properties with commercially available butyl rubber, although polymerization took place at a considerably higher temperature when utilizing the instant novel process.

A study of the correlation of the molecular weight of butyl rubber with polymerization temperature was undertaken, using aluminum chloride, aluminum ethyl dichloride, and the presently disclosed catalyst system. FIGURE 2 is a plot of the logarithm of the molecular weight versus the reciprocal of the polymerization temperature employed in degrees Kelvin times $10^3$ for butyl rubbers obtained with the aforementioned catalyst systems in a methyl chloride solvent.

It is known that $AlCl_3$ and $AlEtCl_2$ yield high molecular weight butyl rubber at low temperatures, e.g., −100° C. and that the logarithm of the molecular weight increases linearly with the reciprocal of temperature. This feature is graphically shown in FIGURE 2 by graphs marked $AlCl_3$ and $AlEtCl_2$. However, the foregoing relationship is not true for the catalyst system of the present novel process. It has been discovered that the molecular weight of butyl rubber obtained by employing the $$AlEt_2Cl\text{-}HCl$$

catalyst system is higher than the molecular weight obtained with the other two catalysts, i.e., $AlCl_3$ and $AlEtCl_2$, at temperatures ranging from −27° C. to −70° C. and is lower at temperatures below −70° C. The graph of FIGURE 2 marked $AlEt_2Cl$-HCl illustrates this phenomenon.

Example 7

The monomer mixture for Runs P, Q, R and S consisted of 97 volume percent isobutene and 3 volume percent isoprene. 20 millimoles of $AlEt_2Cl$ were added to 200 ml. of monomer mixture and the resulting solution divided into four equal portions for the four runs. A promoter solution was prepared by absorbing gaseous HCl in 25 ml. of methyl chloride at −78° C. until a 1 ml. volume increase occurred. Two ml. of this concentrated solution were added to 100 ml. of pure methyl chloride to form the promoter solution. In each run, the monomer mixture and promoter solution were added dropwise to 300 ml. of methyl chloride solvent over a period of 10 to 15 minutes. The polymerization reaction was terminated by introducing precooled methanol. The products were dried in a vacuum at 60° C. Results for each of these runs are summarized in Table VIII.

TABLE VIII

| Run | P | Q | R | S |
|---|---|---|---|---|
| Temperature °C. | −35 | −60 | −78 | −100 |
| Mol. Wt. | 86,000 | 227,000 | 240,000 | 123,000 |
| Mole Percent Unsat. | 1.07 | 1.21 | 2.15 | 1.66 |
| Percent Conversion | 5.7 | 45.5 | 2.8 | 10.0 |

The data in Table VIII show that a maximum molecular weight is obtained at a temperature of about −70° C. with the $AlEt_2Cl$-HCl catalyst system.

When aluminum chloride is used to polymerize butyl rubber, the preferred process sequence is to add the catalyst solution to the monomer charge. If the monomer mixture should be added to the catalyst solution, excessive heat evolution occurs, molecular weight drops and catalyst efficiency falls because of catalyst encapsulation. In the present process, the preferred method is to add a promoter solution to a quiescent solution containing the monomer mixture, the catalyst and the diluent. This mixing sequence, however, can have many variations. For example, one variation consists of first charging the diluent and catalyst into the reactor and then simultaneously feeding the monomers and promoter. Comparative results obtained by using various methods are contained in the following example.

Example 8

The monomer mixture of Example 1 was polymerized using diethyl aluminum chloride as the catalyst and HCl as the promoter. The mixing sequences of the reaction constituents were varied in the manner indicated. The data are summarized in Table IX.

TABLE IX

| Run | Monomers, ml. | Solvent | $Al(C_2H_5)_2Cl$, Moles | Temp., °C. | Charge | Feed | Yield | | Mol. Wt. ×10⁻³ | Unsat. Mole, Percent | Gel Percent |
|---|---|---|---|---|---|---|---|---|---|---|---|
| | | | | | | | Grams | Percent | | | |
| T | 100 | 100 ml. $C_2H_5Cl$ | .01 | −50 | Solvent containing promoter. | Monomers catalyst mixt. added dropwise. | 32 | 45 | 507 | 3.61 | 2.2 |
| U | 100 | 100 ml. $C_2H_5Cl$ | .01 | −80 | do | do | 3 | 4.5 | 593 | 3.16 | 0 |
| V | 100 | 100 ml. $CH_3Cl$ | .0021 | −83 | Monomers plus solvent plus promoter. | Catalyst added dropwise. | 17 | 24 | 374 | 1.47 | 0 |
| W | 100 | 100 ml. $CH_3Cl$ | .0005 | −50 | do | Catalyst | ~7 | ~10 | (1) | | 0 |
| X | 100 | 100 ml. $CH_3Cl$ | .000067 | −50 | do | do | 7 | 10 | (1) | | 0 |
| Y | 13 | 100 ml. $CH_3Cl$ | .0013 | −80 | Solvent plus promoter. | Monomers plus catalyst. | 6 | 65 | 56 | 3.1 | 0 |
| Z | 14 | 100 ml. $CH_3Cl$ | .0014 | −97 | do | do | 13 | 83.5 | 109 | 1.64 | 2.9 |
| AA | 100 | 100 ml. $C_2H_5Cl$ | .01 | −98 | Monomers plus solvent plus catalyst. | Promoter | 12.5 | 17.6 | 1,259 | 1.6 | 36.7 |
| BB | 200 | 600 ml. $CH_3Cl$ | .02 | −85 | do | do | 95 | 67.8 | 281 | 1.69 | 0 |
| CC | 100 | 125 ml. $C_2H_5Cl$ | .01 | −100 | Monomers plus solvent containing promoter. | Catalyst | 0.5 | 0.75 | 1,030 | 1.64 | 0 |
| DD | 200 | 600 ml. $CH_3Cl$ | .02 | −50 | Solvent | Monomers plus premixed catalyst promoter system. | 11.0 | 15.0 | | | 0 |

1 Light oil.

In Runs T, U, and CC, no separate promoter was necessary because of the presence of traces of HCl in the ethyl chloride solvent. The promoter solution for Run V was prepared in the same manner as in Example 7. The promoter solution for Runs W and X was prepared by absorbing HCl gas in 25 ml. of methyl chloride at −78° C. until a 1 ml. increase in volume occurred; pure methyl chloride was then added until a total volume of 100 ml. was obtained. The promoter solution of Runs Y and Z was prepared by absorbing HCl gas in 25 ml. of methyl chloride at −78° C. until the volume increased by 1 ml.; 2 ml. of this solution was diluted with 25 ml. of methyl chloride; 2 ml. of the resulting solution was then added to 100 ml. of pure methyl chloride. The promoter solution for Runs AA and BB was prepared by absorbing HCl gas in 25 ml. of methyl chloride at −78° C. until the volume increased by 1 ml.; 2 ml. of this solution was then added to 25 ml. of methyl chloride. The catalyst-promoter system used in Run DD was prepared by adding 2 ml. of the promoter solution used in Runs AA and BB to 0.02 moles of diethyl aluminum chloride in 100 ml. of methyl chloride at −78° C.

The data in Table IX show the wide variation of polymerization methods possible in the practice of this invention. In Runs T and U, polymerization began as soon as the feed was introduced. The product yield in Run U was small because of the low promoter concentration. In Runs W and X, the product yield was also quite small; conversely this was due to the relatively high concentration of promoter in the system. Those data clearly show that the amount of promoter must be very carefully controlled, since a large excess of promoter will yield products of low molecular weight. Although runs Y and Z exhibited a vigorous reaction as soon as feed addition began, the products were of relatively low molecular weight. This was believed to be due to the high HCl concentration in the system.

The products of runs V and AA were cured according to the cure recipe given in Example 5, and physical tests were performed upon the resulting vulcanizates. Table X lists the inspections of the physical tests for these vulcanizates as well as those of Butyl 218.

TABLE X

| Run | Polymerization Temp., °C. | Cured 30′ at 153° C. | | | Cured 60′ at 153° C. | | |
|---|---|---|---|---|---|---|---|
| | | 300% Mod. | Tensile | Percent Elong. | 300% Mod. | Tensile | Percent Elong. |
| AA | −98 | 1,159 | 3,121 | 603 | 1,566 | 3,259 | 550 |
| V | −83 | 1,110 | 3,100 | 607 | 1,485 | 2,814 | 480 |
| Butyl 218 | −98 | 805 | 2,905 | 632 | 1,257 | 2,824 | 553 |

These data, like the inspections of vulcanizates made from runs in the previous examples, show that the use of the instant novel catalyst system yields a product having physical properties which compare favorably with commercially available butyl rubber.

*Example 9*

A still further advantage of the present invention is the ability to effect butyl rubber polymerizations in bulk (i.e., using the unreacted monomers as solvent) or by using only a very small amount of solvent. Various mixtures of isobutene and isoprene were prepared and designated B–3, B–5 and B–8. The composition of these mixtures were as follows:

$B_3$ contained 97 volume percent isobutene and 3 volume percent isoprene;

$B_5$ contained 95 volume percent isobutene and 5 volume percent isoprene; and $B_8$ contained 92 volume percent isobutene and 8 volume percent isoprene.

In runs EE, FF and GG, the undiluted monomer mixture was used as the reactor solvent. The catalyst was added to the monomer charge and the promoter was introduced dropwise to the quiescent solution to induce reaction. The catalyst in these runs was diethyl aluminum chloride. The promoter solution was prepared by absorbing dry HCl in 25 ml. of the particular monomer mixture used until 1 ml. of volume increase occurred. Two ml. of this solution were withdrawn and diluted with 25 ml. of fresh feed mixture; finally, 2 ml. of the resulting solution were added to 100 ml. of fresh feed mixture, yielding 102 ml. of promoter solution. This monomer-promoter mixture was then added dropwise to the monomer-catalyst charge. All of the runs were performed at −98° C. In each of the runs polymerization began immediately upon promoter introduction. Run EE showed rapid polymerization upon promoter introduction and the reaction had to be terminated because of increasing viscosity. In runs FF and GG, slow and easily controllable polymerization began upon promoter introduction. The results are set forth in Table XI.

TABLE XI

| Run | Monomers | | Catalyst, Moles | Promoter | | Yield | | Mol. wt. ×10⁻³ | Unsaturation, Mol Percent | Gel, Percent |
|---|---|---|---|---|---|---|---|---|---|---|
| | Amount | Type | | Ml. | Mole ×10³ | Grams | Percent | | | |
| EE | 100 ml | B–3 | .02 | 3 | 0.0042 | 9 | 12 | 544 | 1.9 | 9.2 |
| FF | 100 ml | B–5 | .02 | 100 | 0.14 | 28 | 20 | 323 | 3.21 | 4.7 |
| GG | 100 ml | B–8 | .02 | 100 | 0.14 | 18 | 13.5 | 211 | 5.42 | 70 |

The data in Table XI illustrate that successful butyl rubber polymerizations can be carried out in the absence of solvent using the present novel method. It should be noted, however, that molecular weights obtained in these bulk runs decrease with increasing isoprene content in the feed.

Portions of the products of runs EE to GG were cured according to the recipe set forth in Example 5 and the inspections of the resulting vulcanizates were measured and the data obtained tabulated in Table XII.

TABLE XII

| Run | Feed | Cured 30′ at 153° C. | | | Cured 60′ at 153° C. | | |
|---|---|---|---|---|---|---|---|
| | | 300% Mod. | Tensile | Percent Elong. | 330% Mod. | Tensile | Percent Elong. |
| EE | B–3 | 442 | 1,351 | 723 | 557 | 1,645 | 660 |
| FF | B–5 | 775 | 1,562 | 560 | 1,150 | 1,775 | 450 |
| GG | B–8 | | | | 1,300 | 1,575 | 377 |

From the data appearing in Table XII, it can be seen that the physical properties of these vulcanizates are satisfactory.

*Example 10*

Butyl rubbers with improved ozone resistance have conventionally been prepared by either incorporating cyclodiolefinic monomers in with the isobutene-isoprene monomer charge or by replacing the diolefin (isoprene) with a cyclodiolefin. In order to determine if ozone resistant butyl rubbers prepared from an isobutene-cyclodiolefin monomer charge could be prepared at relatively high temperatures (e.g. —50° C.) by the use of the present catalyst system, Run HH was carried out as follows:

A charge consisting of 97 ml. of isobutene, 3 ml. of methyl cyclopentadiene and 90 ml. of methyl chloride was stirred at —50° C. After thermal equilibrium was attained, 1.3 ml. (0.01 mole) of diethyl aluminum chloride was dissolved in 10 ml. of methyl chloride and added to the mixture. The promoter solution was prepared by bubbling HCl gas into 25 ml. of methyl chloride at —78° C. until a 1 ml. volume increase was attained. Thereafter, 0.09 ml. (0.00006 mole HCl) of the promoter solution was added to the quiescent mixture. Polymerization started immediately. The reaction was stirred for 60 minutes and then terminated by introducing chilled methanol. The polymer was recovered and dried in vacuo at 60° C. The yield was 26 grams (representing 36.8% conversion) of high molecular weight rubbery polymer. This run demonstrates that high molecular weight ozone resistant butyl type rubbers can be prepared at higher temperatures than have heretofore been possible with the catalyst system of the instant invention.

*Example 11*

In order to illustrate the criticality of the amount of promoter utilized in the present catalyst system, Runs II, JJ and KK were performed. In each of the three runs, 97 ml. of isobutene, 3 ml. of isoprene and 100 ml. of methyl chloride were mixed in a three-necked reaction flask and refluxed at —21° C. To this mixture was added 0.02 mole of diethyl aluminum chloride. No polymerization occurred. A promoter solution was prepared as follows:

Anhydrous gaseous hydrogen chloride was bubbled into 100 ml. of methyl chloride at —78° C. until 16 grams of hydrogen chloride were absorbed. 9 ml. of this solution corresponding to 0.04 mole of hydrogen chloride were added in Run II. In Run JJ, 2.5 ml. of promoter solution corresponding to 0.01 mole of hydrogen chloride were added. For Run KK, 1 ml. of the above standard promoter solution was diluted with 9 ml. of methyl chloride and 0.45 ml. of this solution, corresponding to 0.0002 mole of hydrogen chloride were added to the reaction flask. In all three runs, vigorous polymerization commenced immediately upon introduction of the promoter solution. Polymerization was terminated by the addition of precooled methanol. The resulting polymers were recovered, dried and tested for molecular weight, iodine number and intrinsic viscosity. Data for the above runs appear in Table XIII.

TABLE XIII

| Run | Mole Ratio HCl/AlEt₂Cl₂ | Intrinsic Viscosity | Molecular Weight X10⁻³ | Iodine Number |
|---|---|---|---|---|
| HH | 2/1 | .324 | 45.08 | 8.3 |
| II | 0.5/1 | .462 | 78.54 | 8.2 |
| JJ | 0.01/1 | .512 | 92.26 | 8.1 |

The data in Table XIII show that the lower the mole ratio of hydrogen chloride to diethyl aluminum chloride, the higher the molecular weight of the resulting polymer, until at a theoretical mole ratio of 0/1, no polymerization occurs. The data, therefore, demonstrate that there exists a point below a mole ratio of 0.01/1 at which maximum molecular weight is obtained.

While there are above described a number of specific embodiments of the present invention, it is obviously possible to employ other embodiments and various equivalent modifications and variations thereof without departing from the spirit of the invention.

Having now described and illustrated this invention, what is desired to be secured by Letters Patent is defined in the accompanying claims.

What is claimed is:

1. A process for copolymerizing a major amount of a $C_4$ to $C_7$ isoolefin with a minor amount of $C_4$ to $C_{14}$ multiolefins which comprises, contacting a mixture of the materials to be polymerized with a catalyst system comprising an anhydrous hydrogen halide and a dialkyl aluminum monohalide having the formula, $$AlR_2X$$

where R is a branched or straight chain $C_1$ to $C_{12}$ alkyl and X is selected from the group consisting of fluorine, chlorine and bromine, at a temperature of between about 0° C. and about —100° C., the mole ratio of an anhydrous hydrogen halide to dialkyl aluminum monohalide being no greater than 0.05:1.

2. A process according to claim 1 in which the isoolefin is isobutene and the multiolefin is isoprene.

3. A process according to claim 1 wherein the temperature is between about —20° C. and about —90° C.

4. A process according to claim 1 in which the dialkyl aluminum monohalide is diethyl aluminum chloride.

5. A process according to claim 1 wherein the monomer mixture comprises from about 70 to about 99.5 parts by weight of an isoolefin and from about 30 to about 0.5 part by weight of a $C_4$ to $C_{10}$ multiolefin.

6. A process for copolymerizing about 95 to about 99.5 wt. percent of isobutene with between about 5 and about 0.5 wt. percent isoprene which comprises, contacting said monomer mixture with a catalyst system comprising an anhydrous hydrogen halide and diethyl aluminum chloride, the mole ratio of said anhydrous hydrogen halide to said diethyl aluminum chloride being no greater than 0.05:1, at a temperature of between about 0° C. and about —100° C.

7. A process according to claim 6 wherein the mole ratio of anhydrous hydrogen halide to diethyl aluminum chloride is about 0.01:1.

No references cited.

JOSEPH L. SCHOFER, *Primary Examiner.*

R. A. GAITHER, *Assistant Examiner.*